(12) United States Patent
Fladby et al.

(10) Patent No.: US 12,404,954 B2
(45) Date of Patent: Sep. 2, 2025

(54) PIPE COUPLING

(71) Applicant: Fladby Connector AS, Nittedal (NO)

(72) Inventors: Jostein Fladby, Oslo (NO); Trygve Fladby, Oslo (NO); Sissel Fladby van Woensel Kooy, Oslo (NO)

(73) Assignee: Fladby Connector AS, Nittedal (NO)

( * ) Notice: Subject to any disclaimer, the term of this patent is extended or adjusted under 35 U.S.C. 154(b) by 0 days.

(21) Appl. No.: 18/276,608

(22) PCT Filed: Feb. 14, 2022

(86) PCT No.: PCT/NO2022/050039
§ 371 (c)(1),
(2) Date: Aug. 9, 2023

(87) PCT Pub. No.: WO2022/173312
PCT Pub. Date: Aug. 18, 2022

(65) Prior Publication Data
US 2024/0110648 A1   Apr. 4, 2024

(30) Foreign Application Priority Data
Feb. 12, 2021   (NO) .................................. 20210185

(51) Int. Cl.
*F16L 15/00* (2006.01)
*F16L 15/08* (2006.01)

(52) U.S. Cl.
CPC ........... *F16L 15/007* (2013.01); *F16L 15/008* (2013.01); *F16L 15/08* (2013.01)

(58) Field of Classification Search
CPC ....... F16L 15/007; F16L 15/008; F16L 15/08; F16L 15/006; F16L 19/0206; F16L 47/16
See application file for complete search history.

(56) References Cited

U.S. PATENT DOCUMENTS

| | | | | |
|---|---|---|---|---|
| 364,666 | A | * | 6/1887 | O'Leary ............... F16L 15/008 |
| 861,828 | A | * | 7/1907 | Gilfillan ................ F16L 15/006 |
| 1,234,537 | A | * | 7/1917 | Goodall |

(Continued)

FOREIGN PATENT DOCUMENTS

| DE | 3128008 A1 | 3/1982 |
|---|---|---|
| FR | 340939 A | 7/1904 |

(Continued)

OTHER PUBLICATIONS

International Search Report issued in corresponding PCT Application No. PCT/NO2022/050039, date mailed May 20, 2022, pp. 1-3.

(Continued)

*Primary Examiner* — William S. Choi
(74) *Attorney, Agent, or Firm* — Robinson & Cole LLP

(57) ABSTRACT

A pipe coupling is described comprising an outer tubular part (1) with threads inside, an inner tubular part (10) with threads outside, and a sleeve (5) where on a first half of the sleeve there are external and inner threads which fit in the threads of the outer and inner tubular parts, respectively, so that the sleeve (5) can be screwed into the outer tubular part (1) while it is simultaneously screwed onto the inner tubular part (10) and the outer and inner tubular parts are firmly connected to each other through the threads on the sleeve (5).

8 Claims, 3 Drawing Sheets

(56) References Cited

U.S. PATENT DOCUMENTS

| | | | |
|---|---|---|---|
| 1,707,087 A * | 3/1929 | Little | F16L 15/007 |
| 2,296,198 A * | 9/1942 | Boynton | |
| 3,778,089 A | 12/1973 | Fredd et al. | |
| 3,994,516 A | 11/1976 | Fredd | |
| 4,426,105 A * | 1/1984 | Plaquin | F16L 15/008 |
| 4,989,902 A | 2/1991 | Putch | |
| 6,554,083 B1 * | 4/2003 | Kerstetter | |
| 6,832,790 B2 * | 12/2004 | Olson | |
| 2002/0070547 A1 * | 6/2002 | Guertin, Jr. | |
| 2015/0323108 A1 | 11/2015 | Mueller et al. | |

FOREIGN PATENT DOCUMENTS

| | | | | |
|---|---|---|---|---|
| GB | 2329946 A * | 4/1999 | | F16L 15/008 |
| WO | 2020139383 A1 | 7/2020 | | |

OTHER PUBLICATIONS

Dubbels Tashenbuch für den Maskinbau, 19th edition 1997, pp. K8 to K12.

* cited by examiner

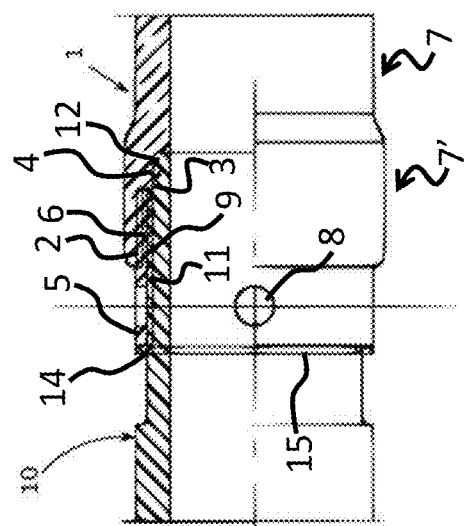
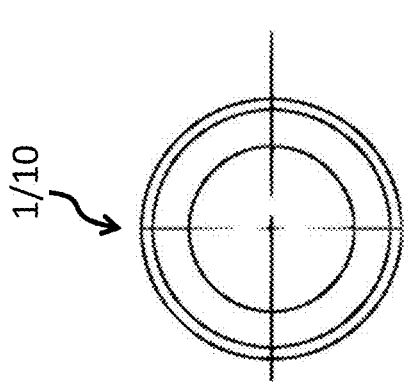
Fig. 2B
Fig. 2A

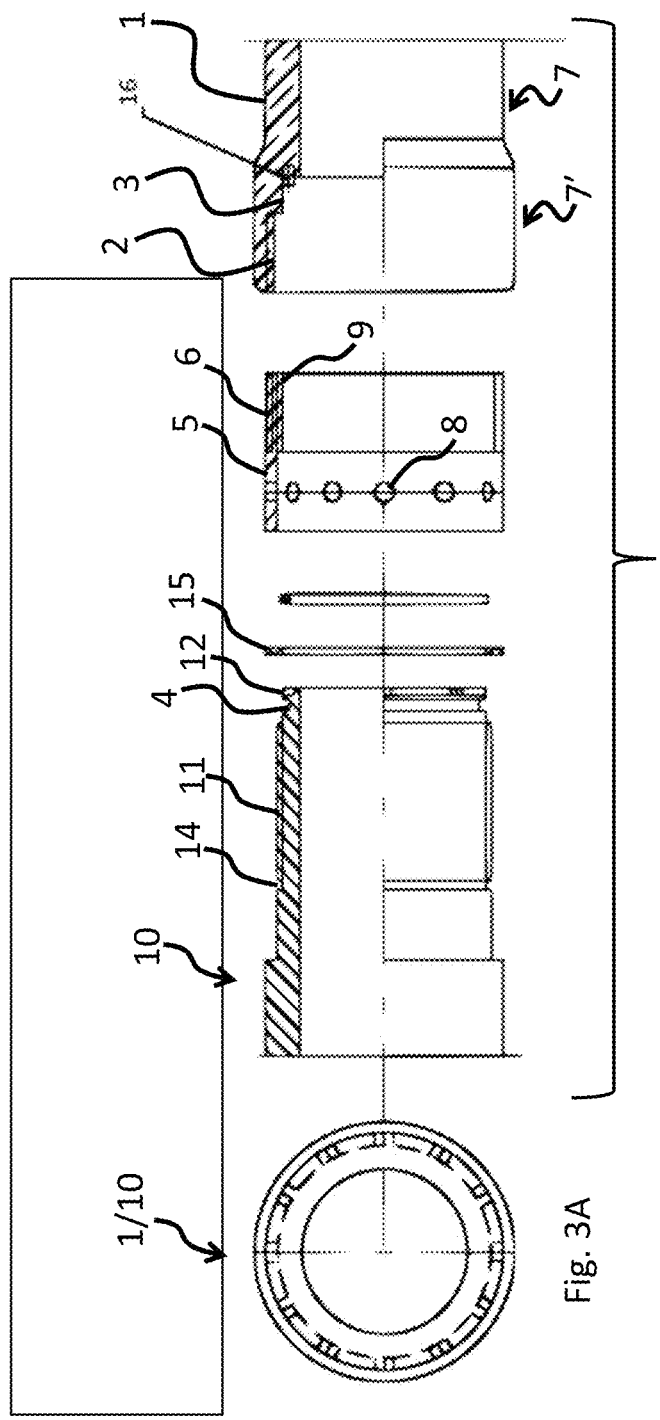

PIPE COUPLING

CROSS REFERENCE TO RELATED APPLICATIONS

The instant application is a U.S. National Stage application of and claims priority to PCT/NO2022/050039, filed on Feb. 14, 2022, which is a PCT application of and claims priority to NO Application No. 20210185, now NO 346672B1, filed on Feb. 12, 2021, the subject matter of both aforementioned applications is hereby incorporated by reference in their entireties.

FIELD OF THE INVENTION

The present invention relates to a coupling or connector for connecting pipes to each other and connecting pipes and hoses to pumps and machines

BACKGROUND

Joining pipes is one of the most widespread mechanical activities in our modern society, but little has happened in this area for many years, probably because it is so common that one has not thought about the need for new solutions here as well in tune with the times. Connecting pipes is also the activity that gives the greatest costs in the form of expensive solutions and leaks. At the same time, it turns out that you want to increase the operating pressure in the systems to save energy and size. This work has been hampered by the lack of good and safe pipe connections.

To describe the prior art, reference is made to Dubbels Tashenbuch für den Maskinbau, 19th edition 1997, pages K8 to K12 as it gives a good overview of the state of the art in this field.

The flange coupling is a widely used and known technique. It has several disadvantages: Flange couplings are large and too space consuming in many places. It is an expensive, heavy and resource-intensive solution, especially when it is to be made of precious materials, for high pressure or for mobile equipment. At very high pressure, it is also difficult to get a flange coupling guaranteed tight. Flange mounting requires a lot of work and great demands are placed on correct installation. There is a risk of blowing out gaskets and splash leaks that can harm people and the environment. The pipes cannot be mounted close together as the flanges are in the way. In the event of vibration, there is a risk of flange couplings loosening if the bolts are not tightened correctly. If you install flanges between pumps and pipes that are not completely correctly fitted, there will be tension in the pipes which could result in breakage and damage.

The other large pipe coupling family is the cutting ring couplings. They are based on a metal ring being compressed in a conical part and pressed into the pipe wall when the couplings are screwed together. The disadvantages here are also many. The cutting ring couplings cannot be used at high pressures at large diameters because it is then a high risk of the pipe blowing out of the coupling. The cutting ring couplings also require very large tightening torques at large dimensions and are difficult to get tight with repeated assemblies and disassemblies, as well as having difficulty holding tight when installed on equipment with vibrations. In addition, the cutting ring couplings are almost hopeless to mount with a robot.

U.S. Pat. No. 3,778,089 describes a coupling for connecting two pipes. One of the pipes is provided with outside threads, while the other pipe is provided with threads on the inside. A sleeve provided with threads both on the outside and inside thereof is used to connect the two pipes. The threads on the sleeve are cylindrical, while the corresponding threads on the two pipes are strongly conical or tapered. This means that the sleeve, when tightened onto the pipes, will act as a wedge and set up radial forces towards the pipes for obtaining a fluid tight connection. This coupling has a disadvantage in that the sealing competence is directly related to compressive stress which means that at high pressures the overall stress may become destructive.

SUMMARY OF THE INVENTION

It is an object of the present invention to provide an improved coupling which avoids the above-mentioned disadvantages of flange couplings and cutting ring couplings.

This is achieved with a coupling as stated in the following claims.

BRIEF DESCRIPTION OF THE DRAWINGS

The invention will now be described in detail with reference to the accompanying drawings, in which FIGS. 2A and 2B show the coupling of FIGS. 1A and 1B, when assembled, in a top view and a cross sectional view, respectively, and FIGS. 3A and 3B show another embodiment of the coupling, in a top view and an exploded cross sectional view, respectively.

DETAILED DESCRIPTION

Figures 1A, 1B:
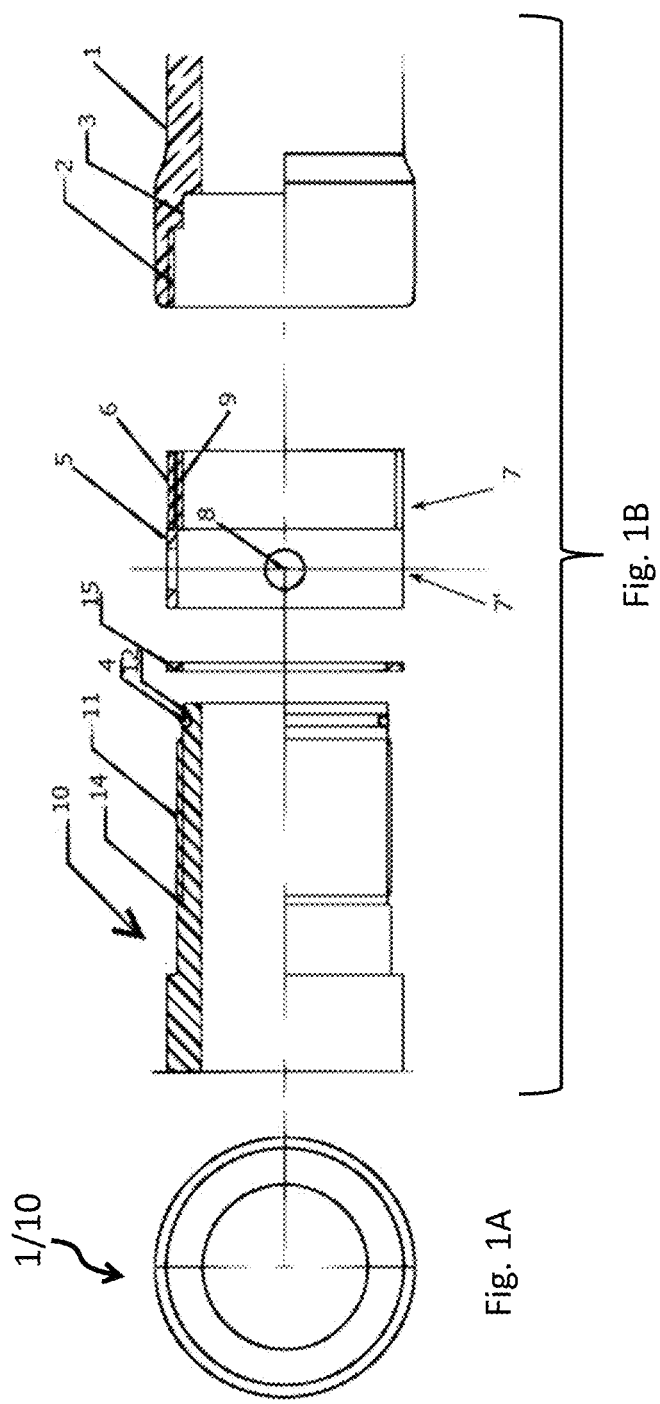
FIGS. 1A and 1B show the individual components which are included in a first embodiment of the invention, in a top view and an exploded cross sectional view, respectively.

A first embodiment of the new coupling consists of three parts as shown in FIG. 1, namely an outer tubular part 1 and an inner tubular part 10 locked together by a sleeve 5.

The outer tubular part 1 includes a first internally threaded portion 2, preferably with standard tubular threads, and a smooth cylindrical portion 3 which a sealing ring 4 is adapted to seal against. The sealing ring may be of any type, such as a rubber O-ring or a metal sealing ring able to withstand higher pressures.

Furthermore, the coupling comprises a sleeve 5 which is arranged to be screwed into the outer tubular part 1. The sleeve 5 has a first half 7 with a second threaded portion 6 with external threads corresponding to the first threaded portion 2 of the outer tubular part 1. The second half 7' of the sleeve 5 has external radial holes 8 or polygons to be able to be screwed on either with a hook spanner, open-end spanner, adjustable spanner or similar tool. The second half of the sleeve may also be provided with wings or grooves allowing the coupling to be tightened by hand. Inside the first half 7 of the sleeve 5 there is a third threaded portion 9 with approximately or the same pitch and length as the first threaded portion 2 in the outer tubular part 1, and with just so much smaller diameter that it forms a cylinder in continuation of the cylindrical portion 3 of the outer tubular part 1. Inside the second half 7' of the sleeve 5, a cylindrical portion with an inner diameter equal to the outer thread diameter of the threads in the second threaded portion 9 has been turned out.

The coupling also comprises an inner tubular part 10 with a fourth threaded portion 11 with external threads corresponding to the threads of the third threaded portion 9 in the sleeve 5, but with a thread length which is equal to the length of the sleeve 5. The inner tubular part 10 also has a sealing ring groove 12 adapted to receive a sealing ring 4 and a locking ring groove 14 at the rear end of the fourth threaded portion 11 to receive a locking ring 15.

When mounting, the sleeve 5 is screwed all the way to the end of the fourth threaded portion 11 on the inner tubular part 10. Then the inner tubular part 10 is pushed into the outer tubular part 1 until the end of the inner tubular part 10 closes tightly against the inner tubular part 1. The sealing ring 4 then abuts against the cylindrical portion 3 and ensures that the medium in the pipe neither comes into contact with the threads nor can leak out. Then the sleeve 5 is screwed back on the fourth threaded portion 11 so that the second threaded portion 6 engages and is screwed onto the first threaded portion 2. The sleeve is then simultaneously screwed inwards into outer tubular part 1 and outwards onto inner tubular part 10 so that inner and outer tubular parts are not displaced relative to each other. The locking ring groove 14 is exposed and the locking ring 15 is mounted in the locking ring groove 14. The locking ring 15 will then prevent the sleeve 5 from turning backwards on the inner tubular part 10 and thereby out of the outer tubular part 1 when the two tubular parts do not rotate relative to each other. The finished coupling is shown in FIG. 2.

Here we have a simple, tight and very strong pipe connection. Often one wants a coupling to withstand a micro-twist without torsional stresses occurring. This is taken care of with this coupling. If it is possible for the inner tubular part 10 to rotate outwards by more than one turn relative to the outer tubular part 1, this rotation can be prevented by mounting the pipe coupling with one or more rotation stop keys 16 in the outer tubular part 1, as shown in FIG. 3. The keys are adapted to engage corresponding bores or recesses in the inner tubular part 10.

The threads in second 6 and third 9 threaded portions may be coated with an anti-friction substance, for example PTFE to facilitate easier assembly and disassembly of the coupling.

All threads mentioned above should be of a non-locking type, such as standard cylindrical pipe threads as commonly used in Europe or slightly tapered pipe threads as used in the US. The use of cylindrical or slightly tapered threads means that the coupling will be held together by forces acting in the axial direction and avoiding strong radial forces for obtaining fluid tightness.

The coupling is dismantled by removing the locking ring 15 from the locking ring groove 14 with, for example, locking ring pliers. Then the sleeve 5 is screwed backwards on the fourth threaded portion 11 until the second threaded portion 6 of the sleeve 5 is free from the first threaded portion of the outer tubular part 1. The coupling can then be taken apart.

What is claimed is:

1. A pipe coupling comprising:
    an outer tubular part having a first inner diameter and first internal threads,
    an inner tubular part having a second inner diameter and first external threads having a first outermost thread diameter,
    the first inner diameter being equal to the second inner diameter;
    a sleeve having a threaded first half of the sleeve and a second half having a cylindrical inside portion having a third innermost diameter that is greater than the first outermost thread diameter, the threaded first half having second internal threads which fit into the first external threads of the inner tubular part and the threaded first half having second external threads which fit into the first internal threads of the outer tubular part, so that the sleeve can be screwed inwards into the outer tubular part while the sleeve is simultaneously screwed outwards onto the inner tubular part so that the inner tubular part and outer tubular part are in fixed relation relative to each other while the sleeve is being screwed onto the outer tubular part and the inner tubular part, and
    the outer tubular part and inner tubular part become connected to each other through the second internal threads and second external threads of the sleeve,
    wherein at one end of the inner tubular part there is a sealing ring groove with a sealing ring for sealing against a smooth cylindrical portion on the outer tubular part.

2. The pipe coupling of claim 1, wherein the cylindrical inside portion is configured to be positioned over a cylindrical outside portion of the inner tubular part.

3. The pipe coupling according to claim 1, wherein the inner tubular part has a locking ring groove arranged to receive a locking ring for locking the sleeve.

4. The pipe coupling according to claim 1, wherein a number of holes for a hook spanner, a polygon for a spanner or a number of wings or grooves is arranged on a second half of the sleeve.

5. The pipe coupling according to claim 1, wherein the threads on the sleeve are coated with an anti-friction substance.

6. The pipe coupling according to claim 1, wherein the first external threads have a first length which defines a first axial extent along the inner tubular part and the sleeve has a length which defines a second axial extent along the sleeve, wherein the first length is equal to the length of the sleeve.

7. The pipe coupling according to claim 1, further including a number of rotation stop keys adapted to lock the outer tubular part to the inner tubular part.

8. The pipe coupling according to claim 1, wherein the threaded first half has a thread root diameter of the second internal threads and the third innermost diameter being equal to the thread root diameter of the second internal threads.

* * * * *